United States Patent [19]

Plank

[11] 4,037,034

[45] July 19, 1977

[54] PHOTODEGRADABLE POLYOLEFIN COMPOSITION CONTAINING A DINAPHTHYLPHTHALATE

[75] Inventor: Don A. Plank, Sarnia, Canada

[73] Assignee: Exxon Research and Engineering Company, Linden, N.J.

[21] Appl. No.: 736,685

[22] Filed: Oct. 28, 1976

Related U.S. Application Data

[63] Continuation-in-part of Ser. No. 562,579, March 27, 1975, abandoned.

[51] Int. Cl.² ................................................. C08J 3/20
[52] U.S. Cl. ................................. 526/5; 260/DIG. 43
[58] Field of Search .................. 526/5; 260/DIG. 43, 260/45.85 T

[56] References Cited

U.S. PATENT DOCUMENTS

| 2,326,736 | 8/1943 | Adelson et al. ............... 204/159.23 |
| 3,797,690 | 3/1974 | Taylor et al. ................ 260/DIG. 43 |
| 3,830,764 | 8/1974 | Hudgin et al. ............... 260/DIG. 43 |

OTHER PUBLICATIONS

Chem. Abs., vol. 56, No. 12, p. 14467f, Baramboim, 1962.

*Primary Examiner*—Eugene C. Rzucidlo
*Attorney, Agent, or Firm*—David A. Roth; Ben C. Cadenhead

[57] ABSTRACT

Plastic compositions containing polyolefins and dinaphthylphthalate compounds having the formula:

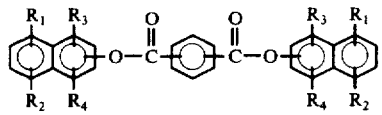

wherein $R_1$, $R_2$, $R_3$ and $R_4$ independently are from the group hydrogen; a straight or branched chain alkyl group having from 1 to 6 carbon atoms; cyano; nitro; lower alkoxy; fluorine, dialkylamino, phenyl, halo-phenyl, benzyl and halo-benzyl, have been found to be photodegradable plastic materials for use, for example, as wrapping films and agricultural mulching films.

9 Claims, No Drawings

PHOTODEGRADABLE POLYOLEFIN COMPOSITION CONTAINING A DINAPHTHYLPHTHALATE

CROSS-REFERENCE TO RELATED APPLICATIONS

This application is a continuation-in-part of Ser. No. 562,579, filed Mar. 27, 1975, now abandoned.

The present invention relates to plastic compositions containing polyolefins (including, without limitation, polyethylene and polypropylene). More specifically, the present invention covers plastic compositions containing polyolefins and certain dinaphthylphthalate compounds (hereinafter defined) as accelerating agents for said plastic compositions in conjunction with photodegradation thereof.

Polyolefins and utility thereof are known in the art as exemplified by *Polyolefin Plastics*, T. O. J. Kresser, (Van Nostrand Reinhold Plastics Applications Series), Van Nostrand Reinhold Company, New York, 1969, and *Modern Plastics Encyclopedia* 1972-1973, Vol. 49: No. 10A, October 1972, pages 78, 83, 85, 87, 89-92, 97 and 158-160 and which publications are in toto incorporated herein by reference.

Poly-alpha-olefins and copolymers thereof containing at least 80 percent by weight of units derived from an alpha-olefinic monomer (which copolymers are hereinafter to be understood to be included in the expression "poly-alpha-olefins"), are used as packaging materials and in agriculture on a very large scale. These polymers undergo degradation and become fragile, e.g., they are aged, when exposed for prolonged periods to sunlight or other forms of U.V. radiation. For many applications, radiation absorbing agents are added to the polymers in order to retard such ageing, but for many other applications it is desirable to accelerate ageing. The latter applies, for example, to mulching films used in agriculture and horticulture and to disposable packaging of all types, such as films, bags, bottles, hollow articles of other forms, and cellulose sheet materials, such as paper, cardboard or regenerated cellulose, which are coated or lined with polyolefins. For reasons of hygiene and site cleanliness, it is very desirable that such disposable packaging materials should undergo natural destruction as quickly as possible after use.

The need for photodegradable polyolefins has also been recognized in the art as exemplified by U.S. Pat. Nos. 3,679,777, 3,767,638 and 3,797,690 and which publications are in toto incorporated herein by reference.

The resultant disadvantages in the utilization of various prior art materials as accelerating agents for polyolefins include, without limitation, factors such as toxicity, discoloration and the large amounts employed in order to be effective. Thus, there is always a demand for a material which will function as an (photodegradable) accelerating agent in polyolefins and concurrently will not, by incorporation therein adversely effect the chemical and/or physical and/or mechanical properties of the resultant polyolefin plastic composition during the useful life thereof.

The prior art problem of providing an photodegradable polyofefin composition having desired chemical, physical and mechanical properties has now been substantially solved by the present invention and the above-described disadvantages substantially overcome.

Accordingly, one of the main objects of the present invention is to provide polyolefin plastic compositions which are photodegradable.

Another object of the present invention is to provide a material for polyolefin plastic compositions which will not substantially adversely affect the chemical and/or physical and/or mechanical properties of said compositions during the useful life thereof.

A further object of the present invention is to provide an (photodegradable) accelerating agent which is economic and easy to incorporate into polyolefin plastics.

It has been found that the foregoing objects can be obtained by the incorporation of certain dinaphthylphthalate compounds in polyolefins to subsequently provide photodegradable plastic compositions which exhibit outstanding chemical, physical and mechanical properties during the useful life thereof.

The dinaphthylphthalate compounds used in the present invention compositions have the general formula:

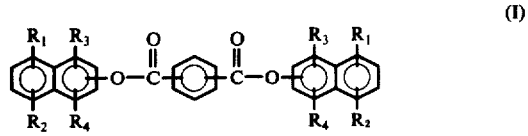

(I)

In Formula I above, $R_1$, $R_2$, $R_3$ and $R_4$ are each independently from the group hydrogen; straight or branched chain alkyl groups having from 1 to 6 carbon atoms (e.g., $CH_3$, $C_2H_5$, $C_3H_7$, $C_4H_9$, $C_5H_{11}$, $C_6H_{13}$ and $CH_2CH(CH_3)CH_3$; cyano (—CN); nitro (—$NO_2$); lower alkoxy (e.g., —$OCH_3$, $OC_2H_5$); fluorine, dialkylamino, e.g. —$N(CH_3)_2$, —$N(C_2H_5)_2$; phenyl (—$C_6H_5$); halophenyl; benzyl (—$CH_2C_6H_5$); and halo-benzyl.

It is to be understood that all of the compounds falling within the above Formula I and as heretofore defined are generically described herein as "dinaphthylphthalate" compounds.

The dinaphthylphthalate compounds employed in the present invention and methods for their preparation are well known in the art. Heretofore, such compounds have principally been employed as chemical intermediates for organic syntheses. The compounds may be readily prepared by the well known esterification reaction between an acid chloride and a naphthol derivative using pyridine as a catalyst.

The specific combination and specific ring position of the above substituent groups, $R_1$, $R_2$, $R_3$ and $R_4$, on the respective naphthol rings, and the specific ring positioning of the phthalate ring, have not been found to have any importance regarding effectiveness on photodegradability of polyolefins when the above dinaphthylphthalate compounds are employed in accordance with the present invention. Accordingly, it is within the scope of the present invention to employ any dinaphthylphthalate compound of the above formula I having any combination of the above substituent groups $R_1$, $R_2$, $R_3$ and $R_4$ at any ring position. Moreover, the phthalate ring may have any position, i.e., para-, meta-, or ortho-, Illustrative (but without limitation) of some of the preferred dinaphthylphthalate compounds useful in the present invention are those having the formula:

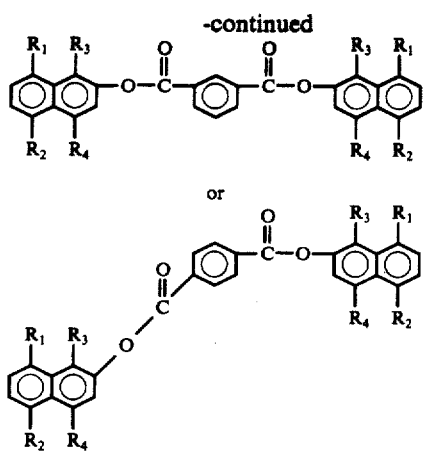

wherein the exemplary definitions of $R_1$, $R_2$, $R_3$ and $R_4$ are listed in Table I.

TABLE I

| Compound No. | $R_1$ | $R_2$ | $R_3$ | $R_4$ |
|---|---|---|---|---|
| 1 | H | $-C_6H_5$ | $-CH_3$ | H |
| 2 | $-C_6H_5$ | H | H | $-CH_3$ |
| 3 | H | $-CN$ | H | H |
| 4 | F | H | $-C_2H_5$ | H |
| 5 | H | H | H | H |
| 6 | H | $-NO_2$ | $NO_2$ | H |
| 7 | $-OCH_3$ | H | $NO_2$ | $CH_3$ |
| 8 | H | $-C_6H_5$ | H | H |
| 9 | $-N(CH_3)_2$ | H | $-C_6H_{13}$ | H |
| 10 | H | $-C_6H_3Br_2$ | $-CH_3$ | H |
| 11 | $-CH_2C_6H_5$ | $-CH_2C_6H_5$ | H | $-C_3H_7$ |
| 12 | H | $-C_6H_3Cl_2$ | $-CH_3$ | H |
| 13 | $-CN$ | $-CN$ | H | $-CN$ |
| 14 | $-H$ | $-CN$ | H | H |
| 15 | $-H$ | $-OC_4H_9$ | $-C_2H_5$ | $-C_2H_5$ |
| 16 | $-C_4H_9$ | $-C_4H_9$ | H | $-OCH_3$ |
| 17 | Br | $-C_6H_5$ | $-CH_3$ | $-CH_3$ |
| 18 | H | $-CH_2CH(CH_3)CH_2CH_3$ | H | H |
| 19 | $-NO_2$ | $-NO_2$ | $-NO_2$ | H |

The amount of substituted dinaphthylphthalate compound employed in the present invention compositions is any quantity which will effectively render the polyolefin containing compositions photdegradable. In general, the amount used is from about 0.01 to 5.0% by weight, based on the total weight of the composition. Preferably, the amount employed is from about 0.05 to about 2.0% by weight. It is to be understood that any amount can be used as long as it does not substantially adversely effect the chemical and/or physical and/or mechanical properties of the end polymer composition during its useful life. The amount utilized, however, is such amount which achieves the objectives described herein.

It is to be understood that the term polyolefins as used herein means butylene polymers, ethylene polymers (such as low and high density polyethylene), olefin polymers, and propylene polymers (such as polypropylene), including crosslinked, filled and/or reinforced versions of the same.

Butylene polymers include, without limitation, those derived from the monomers 1-butene ($H_2C=CHCH_2CH_3$), 2-butene ($CH_2CH=CH_3$), iso butylene ($(CH_3)_2C=CH_2$), 3-methyl-1-butene ($H_2C=CHCH(CH_3)_2$), and cyclobutene

Ethylene polymers include, without limitation, polymers of the formula $(CH_2-CH_2)_n$ with various degrees of wide branches and including polyethylene (high and low density), crosslinked polyethylene, wax blends, ethylene-vinyl acetate copolymers and blends, ethylene-alkyl acrylate copolymers and blends, carboxyl-containing ethylene copolymers, ionomers, and other derivatives of polyethylene. Olefin polymers are those polymers derived from higher olefins such as $C_5C_{12}$.

Propylene polymers include, without limitation, the crystalline homopolymers of propylene including oxidized, chemically modified, and graft modified propylene polymers and polypropylene.

Thus the polyolefins used in the present invention compositions is any polyolefin herein defined and which one so desires to render photodegradable. It is to be understood that the polyolefins used can be a "virgin" material, i.e. substantially free of additives such as flame retardants, plasticizers, dyes, pigments, fillers, and the like, or the polyolefins can have additives (such as those mentioned and described herein) already contained therein or added concurrently with or after the addition of the substituted dinaphthylphthalate compounds.

It is also witin the scope of the present invention to employ other materials in the present invention compositions where one so desires to achieve a particular end result. Such materials include, without limitation, adhesion promotors; antioxidants; antistatic agents; antimicrobials; colorants; flame retardants such as those listed on pages 456–458, Modern Plastics Encyclopedia, ibid; pigments, plasticizers; and fillers.

In this latter category, i.e. fillers, there can be mentioned without limitation, materials such as glass; carbon; cellulosic fillers (wood flour, cork and shell flour); calcium carbonate (chalk, limestone, and precipitated calcium carbonate); metal flakes; metallic oxides (aluminum, beryllium oxide and magnesia); metallic powders (aluminum, bronze, lead, stainless steel and zinc); polymers (comminuted polymers and elastomerplastic blends); silica products (diatomaceous earth, novaculite, quartz, sand, tripoli, fumed colloidal silica, silica aerogel, wet process silica); silicates (asbestos, kaolimite, mica, nepheline syenite, talc, wollastonite, aluminum silicate and calcium silicate); and inorganic compounds such as barium ferrite, barium sulfate, molybdenum disulfide and silicon carbide.

Where one desires to use a flame retardant in the polyolefin plastic compositions, it is also within the scope of the present invention to use certain metal compounds as "enhancing agents" to promote a cooperative effect therebetween and thus enhance the flame retardancy of the resultant plastic compositions as compared to the flame retardancy of either one component used separately. These "enhancing agents" are from the group antimony, arsenic, bismuth, tin and zinc-containing compounds. Without limitation, examples of said enhancing agents include $Sb_2O_3$, $SbCl_3$, $SbBr_3$, $SbI_3$, $SbCl$, $As_2O_3$, $As_2O_5$, $ZnBO_4$, $BaB_2O_4 \cdot H_2O$, $2 \cdot ZnO \cdot 3B_2O_3 \cdot 3.5H_2O$ and stannous oxide hydrate. A preferred enhancing agent is antimony trioxide.

The above mentioned materials, including fillers, are more fully described in Modern Plastics Encyclopedia, ibid, and which publication is incorporated herein (in toto) by reference.

The amount of the above described materials employed in the present invention compositions can be any quantity which will not substantially adversely effect the desired results derived from the present invention compositions. Thus, the amount used can be zero (0) percent, based on the total weight of the composition, up to that percent at which the composition can still be classified as a plastic. In general, such amount will be from about 0 to about 75% and specifically from about 1 to about 50%.

The substituted dinaphthylphthalate compounds (additives) can be incorporated in to the polyolefins at any processing stage in order to prepare the present invention compositions. In general, this is undertaken prior to fabrication either by physical blending or during the process of forming polyolefins per se. Where one so desires, the substituted dinaphthylphthalate compounds may be micronized into finely divided particles prior to incorporation into the polyolefin.

For example, specific intimate mixing of the polyolefin and the additive is effected by melting and mixing the polymer with the additive by any suitable means, for example, in an internal mixer of the Banbury or Werner type operating continuously or batchwise or in a single or double screw extruder. During this operation, various other additives, such as colored pigments, carbon black, anti-oxidants, or anti-misting agents, can also be added.

All the methods and materials used for converting polyolefins, olefin copolymers and polyolefin mixtures into films, hollow articles, laminates, etc., can be applied to the compositions according to this invention. In particular, in the case of films, the optical properties of the product vary according to the type of conversion used (for example, flat poured or dipped film, or tubular film (or sheathing) cooled in air) and the nature of the polymer.

Films manufactured from the polymer compositions according to the invention may be transparent or uniformly translucent. In some applications, for example, agricultural mulching, transparency is generlly unimportant. However, it is sometimes necessary for the mulching film to be transparent, more particularly for the cultivation of asparagus, and in this case it is advantageous to incorporate a suitable proportion of anti-misting agent in the polymer composition according to the invention.

EXAMPLE I

A polypropylene plastic material, (containing 0.25% by weight of distearyl thiodypropionate, 0.08% by weight of dioctadecyl (3,5-di-tert-butyl-4-hydroxybenzyl) phosphonate and 0.10% by weight of paranonylphenol) is utilized as the base resin in order to prepare 20 formulations (plastic compositions). With the exception of formulation No. 1, the particular substituted dinaphthylphthalate compound is incorporated into the plastic by adding both to a Brabender mixer ("Plastic-Corder", Torque Rheometer, Model PLV-150, C. W. Brabender Instruments Inc., South Hackensack, N.J.). The mixture is equipped with a pair of roller type blades positioned within a head provided with heat transfer means.

The resultant mixture is heated to about 240° C.; at this temperature, it is in a molten state. The percentages by weight of each component utilized in the respective formulations are listed in Table II. Each formulation is discharged from the mixer and upon cooling solidifies and is ground into chips. The chips are subjected to extrusion via the use of a 1¼ inch HPM Monofilament Line with a die head which produces a single filament which is wound up on a spool. Samples of the filament are removed and tested in the following described manner.

Strip monofilament samples of each of Formulations Nos. 1 through 20 Table II, are subjected to light stability tests via the use of a "Weather-Ometer", 6000 Watt, model 60 WRC, Atlas Electrical Devices Company, Chicago, Ill. Utilizing an operating temperature of 145° F and and 50% relative humidity, each strip is subjected to the indicated number of hours (Table II) of "simulated daylight" via the use of xenon arc.

The "exposed" strip monofilament samples are removed from the Weather-Ometer and are then subjected to a standard tensile strength test, i.e. ASTM D-638-72 via the use of the model TM Instron Tester. ASTM No. D-638-72 is used here as a test which correlates the degree of photodegraduation of a plastic specimen to the tensile strength thereof; this correlation is stated as a Percent, %, Retention of Tenacity. Thus, a lower percentage value would be indicative of better photodegration.

This ASTM method is fully described in 1972 Annual Book of ASTM Standards — Part 27, published by the American Society For Testing and Materials, 1916 Race Street, Philadelphia, Pa.; this publication is to be considered as incorporated (in toto) herein by reference.

The results of these Weather-Ometer/Tensile Strength tests are shown in Table II.

TABLE II

Photodegradation Data For Polypropylene Plastic Compositions Containing Dinaphthylphthalate

| Formulation No. | "Phthalate" No. | Compound* % | "Weather-Ometer" Hours | Retention of Tenacity % |
| --- | --- | --- | --- | --- |
| 1. | — | 0 | 250 | 87 |
|  | — | 0 | 500 | 75 |
| 2. | 1 | 0.05 | 250 | 30 |
|  | 1 | 0.05 | 500 | 0 |
| 3. | 4 | 0.10 | 250 | 36 |
|  | 4 | 0.10 | 500 | 0 |
| 4. | 5 | 0.05 | 250 | 38 |
|  | 5 | 0.05 | 500 | 0 |
| 5. | 6 | 0.15 | 250 | 22 |
|  | 6 | 0.15 | 500 | 0 |
| 6. | 7 | 0.20 | 250 | 30 |
| 7. | 8 | 0.50 | 250 | 28 |
| 8. | 9 | 0.20 | 500 | 0 |
| 9. | 10 | 0.15 | 250 | 32 |
| 10. | 11 | 0.01 | 250 | 46 |
| 11. | 12 | 0.75 | 250 | 26 |
| 12. | 13 | 0.15 | 500 | 0 |
| 13. | 14 | 0.15 | 250 | 36 |
| 14. | 15 | 0.05 | 250 | 40 |
| 15. | 16 | 0.10 | 500 | 0 |
| 16. | 17 | 0.20 | 250 | 30 |
| 17. | 18 | 0.25 | 250 | 28 |
| 18. | 19 | 0.90 | 250 | 38 |
| 19. | 20 | 0.15 | 500 | 0 |
| 20. | ** | 0.05 | 250 | 18 |
|  | ** | 0.05 | 500 | 0 |

*Formula II, Table I
**Beta-naphthyl-isophthalate (Formula III, Table I, No. 6)

In conjuncation with the results set forth in Table II, it can readily be seen that the addition of the dinaphtylaphthalate compound in the polypropylene composition results in a plastic material with exhibits substantial degradation when exposed to "light". Specifically, it will be noted that in Formulation I the individual test strips were exposed separately at 250, 500 and 750 hours and the resultant retention of tenacity was respectively 84, 48 and 0%. This control material did not contain the substituted dinaphthylphthalate compound. These percentages are contrasted to Formulations 2 to 20 which are the polypropylene plastic materials containing the substituted dinaphthylphthalate compounds. The percentages are readily seen to be substantially below those of the control material and thus, point out the uniqueness of using these types of substituted dinaphthylphthalate compounds as accelerating agents for polyolefins.

EXAMPLE II

Example I is repeated again utilizing a low density polyethylene plastic material as the base resin instead of the polypropylene material. The results obtained from the repeat of this example show similar results as those obtained in Example I and that the substituted dinaphthylphthalate compounds are effective in providing photodegradable polyethylene compositions which have commercial application.

EXAMPLE III

Example I is repeated again utilizing a high density polyethylene plastic material as the base resin instead of the polypropylene material. The results obtained from the repeat of this example show similar results as those obtained in Example I and that the dinaphthylphthalate compounds are effective in providing photodegradable polyethylene compositions which have commercial application.

EXAMPLE IV

The procedure of Examples I, II and III are repeated except that the plastic material which is used as the base resin did not contain any additives (except the accelerating agent where so indicated). Substantially the same results are obtained using the virgin plastic as those obtained using the plastic containing additives in addition to the accelerating agents.

EXAMPLE V

A polypropylene plastic material (containing 0.25 wt.% of distearyl thiodipropionate, 0.07 wt.% 1,3,5-tris (3,5-di-t-butyl-4-hydroxybenzyl)-5-triazine-2,4,6-(1H, 3H, 5H)-trione (Goodrite 3114, B. F. Goodrich Co.) and 0.10 wt.% high molecular weight phosphite (Weston 618, Weston Chemical Co.)) was utilized as a base resin in order to prepare three formulations. Formulations No. 1 was the base resin. Formulation No. 2 included incorporation of 0.05 wt.% beta-napthylterephthalate (Formula II, Table I, No. 5). Formulation No. 3 included incorporation of 0.05 wt.% beta-napthylisophthalate (Formula III, Table II, No. 20). The formulations were prepared and tested for stability as described in Example I. The results are set forth in the following Table III.

TABLE III

| Formulation No. | "Phthalate" Cmpd., Wt. % | "Weather-Ometer" Hours | Retention of Tenacity, % |
|---|---|---|---|
| 1 | 0 | 250 | 84 |
|   |   | 500 | 48 |
| 2 | 0.05 | 250 | 21 |
|   | 0.05 | 500 | 0 |
| 3 | 0.05 | 250 | 0 |
|   | 0.05 | 500 | — |

The results set forth in Table III illustrate the effectiveness the dinaphthlphthalate compounds of the subject invention have in substantially degrading polypropylene compositions containing different antioxidants as compared to the results of Table II.

In conjunction with the examples set forth herein and particularly Example I, formulations 1, 5 and 20 (Table II) and Example V, formulations 1-3 (Table III), represent actual experiments and thus the data obtained therefrom are actual values. A comparison of the results for formulations 1, 5 and 20 (Table II, Example I) and 1 through 3 (Table III, Example V) illustrates that specific ring positioning of the dinaphthylphthalate compounds is not important in the photodegradability effectiveness of the compounds within the scope of the invention.

Formulations 2 through 4 and 6 through 19 represent prophetic examples and the results obtained are extrapolations from the other experiment. Furthermore, Examples II, III and IV also represent prophetic examples predicated upon an extrapolation of the experimental data conducted to date.

In view of the foregoing Examples and remarks, it is seen that the plastic compositions, which incorporate these substituted dinaphthylphthalate compounds, possess characteristics which have not been readily obtainable in the prior art. Thus, the use of these particular compounds in the above described plastic material as (photodegradable) accelerating agents therefor is quite unique since it is not possible to predict the effectiveness and functionality of any particular additive in any polymer system until it is actively undergone incorporation therein and the resultant plastic composition tested according to various ASTM Standards. Furthermore, it is necessary, in order to have commercial utility, that the resultant photodegradable plastic compositions possess characteristics for the desired end use. Use of these substituted dinaphthylphthalate compounds in the plastic material has accomplished all of these obejectives.

The above examples have been described in the foregoing specification for the purpose of illustration and not limitation. Many other modifications and ramifications will naturally suggest themselves to those skilled in the art based on this disclosure. These are intended to be comprehended as within the scope of this invention.

What is claimed is:

1. A plastic composition containing polyolefin having incorporated therein an effective amount of an accelerating agent which is a dinaphthylphthalate compound having the formula:

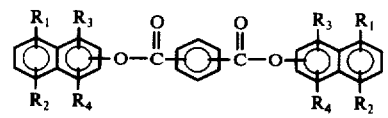

wherein $R_1$, $R_2$, $R_3$ and $R_4$ are selected from the group consisting of hydrogen; a straight or branched chain alkyl group having from 1 to 6 carbon atoms; cyano; nitro; lower alkoxy; fluorine; dialkylamino; phenyl; halo-phenyl; benzyl; or halo-benzyl.

2. The composition as set forth in claim 1 wherein $R_1$, $R_2$, $R_3$ and $R_4$ are all hydrogen.

3. The composition of claim 1 wherein the accelerating agent is present in an amount of from about 0.01 to about 5.0% by weight based on a total weight of the composition.

4. The composition of claim 1 wherein the dinaphthylphthalate compound has the formula:

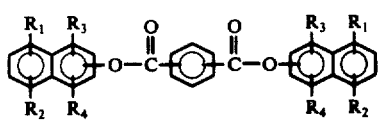

5. The composition of claim 4 wherein $R_1$, $R_2$, $R_3$ and $R_4$ are all hydrogen.

6. The composition of claim 5 wherein the dinaphthylphthalate is present in an amount of from about 0.01 to about 5.0% by weight based on a total weight of the composition.

7. The composition of claim 1 wherein he dinaphthylphthalate compound has the formula:

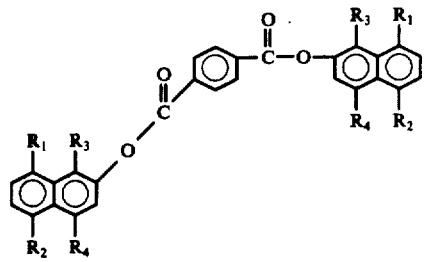

8. The composition of claim 7 wherein $R_1$, $R_2$, $R_3$ and $R_4$ are all hydrogen.

9. The composition of claim 8 wherein the dinaphthylphthalate is present in an amount of from about 0.01 to about 5.0% by weight based on a total weight of the composition.

* * * * *